US012767216B2

(12) United States Patent
Hosono et al.

(10) Patent No.: US 12,767,216 B2
(45) Date of Patent: Oct. 20, 2026

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Hiroshi Hosono, Toyota (JP); Terutaka Tamaizumi, Okazaki (JP); Yuki Inden, Okazaki (JP); Saki Takahashi, Seto (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 18/675,363

(22) Filed: May 28, 2024

(65) Prior Publication Data

US 2024/0400131 A1 Dec. 5, 2024

(30) Foreign Application Priority Data

May 31, 2023 (JP) ................................ 2023-089706

(51) Int. Cl.
*B62D 5/04* (2006.01)
*B62D 5/00* (2006.01)
*B62D 6/00* (2006.01)

(52) U.S. Cl.
CPC ......... *B62D 5/0481* (2013.01); *B62D 5/0409* (2013.01); *B62D 5/0421* (2013.01); *B62D 6/00* (2013.01); *B62D 5/001* (2013.01)

(58) Field of Classification Search
CPC .. B62D 5/0481; B62D 5/0409; B62D 5/0421; B62D 6/00; B62D 5/001; B62D 6/008; B62D 5/049; B62D 5/0463
See application file for complete search history.

(56) References Cited

U.S. PATENT DOCUMENTS 6,625,530 B1 * 9/2003 Bolourchi .............. B62D 6/008 180/402
9,440,674 B2 * 9/2016 Oblizajek ............ B62D 5/0472
(Continued)

FOREIGN PATENT DOCUMENTS

CN 108367774 A * 8/2018 ........... B62D 5/0403
CN 114206707 A * 3/2022 ............. B62D 6/007
(Continued)

OTHER PUBLICATIONS

Machine Translation of CN 108367774 A PDF File Name: "CN108367774A_Machine_Translation.pdf" (Year: 2018).*
(Continued)

*Primary Examiner* — Grant Moubry
*Assistant Examiner* — Ruben Picon-Feliciano
(74) *Attorney, Agent, or Firm* — Oliff PLC

(57) ABSTRACT

A steering control device includes a processor that controls, as a target, a steering system including a reaction force motor that applies a steering reaction force to a steering shaft and a turning motor that turns a turning wheel, and that executes a reaction force setting process, a phase compensation process, and a reaction force application process. The reaction force setting process is a process of setting the steering reaction force using the phase compensation process. The reaction force application process is a process of operating the reaction force motor so as to produce a reaction force as set by the reaction force setting process. The phase compensation process is a process of performing phase compensation of the steering reaction force in a different manner when a travel mode of a vehicle is different.

8 Claims, 4 Drawing Sheets

(56) References Cited

U.S. PATENT DOCUMENTS

| | | | | |
|---|---|---|---|---|
| 2006/0069481 | A1* | 3/2006 | Kubota | B62D 5/0463 701/41 |
| 2009/0281692 | A1* | 11/2009 | Tamaizumi | B62D 5/0484 701/42 |
| 2017/0267276 | A1 | 9/2017 | Kodera et al. | |
| 2019/0225261 | A1* | 7/2019 | Kodera | B62D 5/0463 |
| 2022/0266894 | A1* | 8/2022 | Endo | B62D 6/007 |
| 2023/0192181 | A1 | 6/2023 | Aoki | |

FOREIGN PATENT DOCUMENTS

| | | | | |
|---|---|---|---|---|
| JP | 2002337711 | A | * | 11/2002 |
| JP | 2017-144887 | A | | 8/2017 |
| JP | 2019064483 | A | * | 4/2019 |
| JP | 2020037370 | A | * | 3/2020 |
| JP | 2021028203 | A | * | 2/2021 |
| WO | 2022/044769 | A1 | | 3/2022 |

OTHER PUBLICATIONS

Machine Translation of JP 2020037370 A PDF File Name: "JP2020037370A_Machine_Translation.pdf" (Year: 2020).*

Machine Translation of JP 2002337711 A PDF File Name: "JP2002337711A_Machine_Translation.pdf" (Year: 2002).*

Machine Translation of JP 2021028203 A PDF File Name: "JP2021028203A_Machine_Translation.pdf" (Year: 2021).*

Machine Translation of JP 2019064483 A PDF File Name: "JP2019064483A_Machine_Translation.pdf" (Year: 2019).*

Machine Translation of CN 114206707 A PDF File Name: "CN114206707A_Machine_Translation.pdf" (Year: 2022).*

Oct. 29, 2024 Extended European Search Report issued in European Patent Application No. 24178449.5.

* cited by examiner

STEERING CONTROL DEVICE

CROSS-REFERENCE TO RELATED APPLICATION

This application claims priority to Japanese Patent Application No. 2023-089706 filed on May 31, 2023, incorporated herein by reference in its entirety.

BACKGROUND

1. Technical Field

The present invention relates to a steering control device.

2. Description of Related Art

For example, Japanese Unexamined Patent Application Publication No. 2017-144887 (JP 2017-144887 A) describes a control device that controls an electric power-assisted steering device as a target. Using a phase compensation process, this control device sets a torque of a motor that generates an assistive force. This setting aims at stabilization of a steering system etc.

SUMMARY

An appropriate manner of phase compensation for stabilizing the steering system can vary depending on the travel mode of the vehicle. In particular, in the case of a steering system in a state where power transmission between a steering shaft and turning wheels is cut off, steering is not subjected to resistance from the turning wheel side, which makes the system prone to instability. Thus, the stability of the system tends to be sensitively influenced by the travel mode.

Means for solving this problem and the workings and advantages thereof will be described below.

An aspect of the present invention is a steering control device. The steering control device includes a processor that is configured to control, as a target, a steering system including a reaction force motor that applies a steering reaction force to a steering shaft and a turning motor that turns a turning wheel, and to execute a reaction force setting process, a phase compensation process, and a reaction force application process. The reaction force setting process is a process of setting the steering reaction force using the phase compensation process. The reaction force application process is a process of operating the reaction force motor so as to produce a reaction force as set by the reaction force setting process. The phase compensation process is a process of performing phase compensation of the steering reaction force in a different manner when a travel mode of a vehicle is different.

In the above-described configuration, the phase compensation is performed in a different manner when the travel mode is different, so that appropriate phase compensation for stabilizing the steering system can be performed regardless of the type of the travel mode.

In the above-described steering control device, the travel modes among which the manner of the phase compensation differs may include a mode in which a diagnosis that there is an abnormality has been made and a mode for normal times. Control of the vehicle including the steering system tends to differ between the mode in which a diagnosis that there is an abnormality has been made and the mode for normal times. Accordingly, an appropriate manner of the phase compensation for stabilizing the steering system may differ according to whether there is an abnormality. In the above-described configuration, therefore, the manner of the phase compensation is changed between the mode in which a diagnosis that there is an abnormality has been made and the mode for normal times. Thus, appropriate phase compensation for stabilizing the steering system can be performed regardless of whether a diagnosis that there is an abnormality has been made.

In the above-described steering control device, the phase compensation process may be a process of performing phase compensation of the steering reaction force according to a value of a phase compensation specifying variable, and include a variable changing process. The phase compensation specifying variable may be a variable that specifies the manner of the phase compensation. The variable changing process may include a process of changing the value of the phase compensation specifying variable according to a vehicle speed. The modes in which a diagnosis that there is an abnormality has been made may include a mode in which a diagnosis that there is an abnormality in a detected value of the vehicle speed has been made. The phase compensation process may include a process of executing the phase compensation with the value of the phase compensation specifying variable set to a value for the abnormality in the mode in which a diagnosis that there is an abnormality in the detected value of the vehicle speed has been made.

In the above-described configuration, appropriate phase compensation is performed according to the vehicle speed. However, when there is an abnormality in the detected value of the vehicle speed, the phase compensation according to the vehicle speed that is executed when there is no abnormality cannot be appropriately executed. In the above-described configuration, therefore, when there is an abnormality in the detected value of the vehicle speed, phase compensation exclusive to abnormal events is executed. Thus, even when there is an abnormality in the detected value of the vehicle speed, the steering system can be stabilized by the phase compensation process.

In the above-described steering control device, the travel modes among which the manner of the phase compensation differs may include an intervention mode and a non-intervention mode. The intervention mode may be a mode in which control intervenes in the turning of the turning wheel according to information on a relationship between the vehicle and the outside of the vehicle. The non-intervention mode may be a mode in which the intervention is not performed. The phase compensation process may be a process of performing phase compensation of the steering reaction force according to a value of the phase compensation specifying variable. The phase compensation specifying variable may be a variable that specifies the manner of the phase compensation. The phase compensation process may include a process of executing the phase compensation according to the value of the phase compensation specifying variable that differs between the intervention mode and the non-intervention mode.

In the case where control intervenes in the turning of the turning wheel, necessary conditions for keeping the steering system stable can be different from those in the case of steering by a person alone. In the above-described configuration, therefore, the manner of the phases compensation is changed between the intervention mode and the non-intervention mode. Thus, the steering system can be stabilized regardless of whether the mode is the intervention mode.

In the above-described steering control device, the reaction force setting process may include an assistance amount setting process and an axial force setting process. The axial force setting process may be a process of setting an axial force that is a force acting against a driver's operation of rotating the steering shaft. The assistance amount setting process may be a process of setting an assistance amount according to a detected value of a steering torque. The assistance amount may be an amount of assisting the driver in rotating the steering shaft. The steering reaction force may be an amount that is determined according to a value obtained by subtracting the assistance amount from the axial force. The phase compensation process may include a phase delay compensation process. The phase delay compensation process may be a process of delaying a phase of the detected value used for setting the assistance amount according to a delay specifying variable. The delay specifying variable may be a variable that specifies the phase delay compensation process and assume a different value when the travel mode is different.

In the above-described configuration, the manner of the phase compensation by the phase delay compensation process is changed when the travel mode is different. Thus, appropriate phase delay compensation can be realized according to the travel mode.

In the above-described steering control device, the reaction force setting process may include an assistance amount setting process and an axial force setting process. The axial force setting process may be a process of setting an axial force that is a force acting against a driver's operation of rotating the steering shaft. The assistance amount setting process may be a process of setting an assistance amount and include the phase compensation process and a basic assistance amount setting process. The assistance amount may be an amount of assisting the driver in rotating the steering shaft. The basic assistance amount setting process may be a process of setting a basic assistance amount according to a detected value of a steering torque input into the steering shaft. The phase compensation process may include a phase advance compensation process. The phase advance compensation process may be a process of calculating, according to an advance specifying variable, an advance correction amount for the basic assistance amount in order for the assistance amount setting process to set the assistance amount from the basic assistance amount using the detected value as an input. The steering reaction force may be an amount that is determined according to a value obtained by subtracting the assistance amount from the axial force. The advance specifying variable may be a variable that specifies the phase advance compensation process and assume a different value when the travel mode is different.

In the above-described configuration, the manner of the phase compensation by the phase advance compensation process is changed when the travel mode is different. Thus, appropriate phase advance compensation can be realized according to the travel mode.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

First Embodiment

A first embodiment will be described below with reference to the drawings.

Prerequisite Configuration

Figure 1:
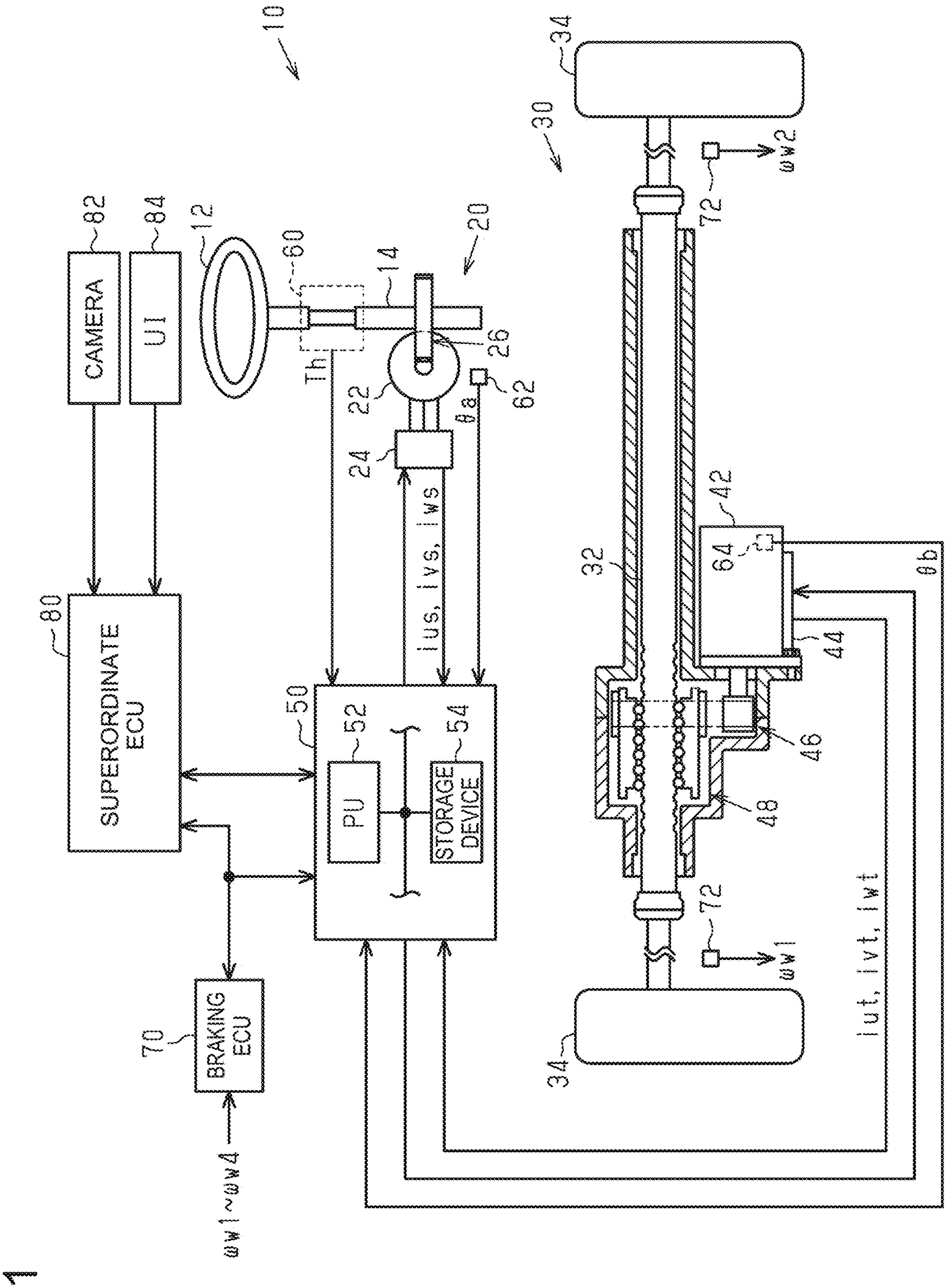
FIG. 1 is a diagram showing the configuration of a steering system according to a first embodiment.

A steering device 10 of a vehicle shown in FIG. 1 is a steer-by-wire device. The steering device 10 includes a steering wheel 12, a steering shaft 14, a reaction force actuator 20, and a turning actuator 30. The steering shaft 14 is coupled to the steering wheel 12. The reaction force actuator 20 is an actuator that applies a force acting against a force with which a driver operates the steering wheel 12. The reaction force actuator 20 has a reaction force motor 22, a reaction force inverter 24, and a reaction force speed reduction mechanism 26. The reaction force motor 22 applies a steering reaction force that is a force acting against steering to the steering wheel 12 through the steering shaft 14. The reaction force motor 22 is coupled to the steering shaft 14 through the reaction force speed reduction mechanism 26. As one example, a three-phase synchronous motor is adopted as the reaction force motor 22. The reaction force speed reduction mechanism 26 is formed by, for example, a worm-and-wheel.

The turning actuator 30 is an actuator for the purpose of turning wheels 34 according to the driver's steering intension that is indicated by the driver's operation of the steering wheel 12. The turning actuator 30 includes a rack shaft 32, a turning motor 42, a turning inverter 44, a turning transmission mechanism 46, and a conversion mechanism 48. As one example, a three-phase surface magnet synchronous motor (SPM) is adopted as the turning motor 42. The turning transmission mechanism 46 is formed by a belt transmission mechanism. Rotary motive power of the turning motor 42 is transmitted to the conversion mechanism 48 by the turning transmission mechanism 46. The conversion mechanism 48 converts the transmitted rotary motive power into shifting motive power of the rack shaft 32 in an axial direction. As the rack shaft 32 shifts in the axial direction, the turning wheels 34 are turned.

The steering control device 50 controls the steering wheel 12 and the turning wheels 34 as targets. Specifically, the steering control device 50 controls the steering reaction force acting against the driver's steering that is a control amount of the steering wheel 12 as the control target. Further, the steering control device 50 controls a turning angle that is a control amount of the turning wheels 34 as the control targets. The turning angle is a steered angle of tires as the turning wheels 34.

To control the control amounts, the steering control device 50 refers to a steering torque Th detected by a torque sensor 60. The steering torque Th is a torque that the driver has applied to the steering shaft 14 through operation of the steering wheel 12. To control the control amounts, the steering control device 50 refers to a rotation angle θa that is an angle of a rotating shaft of the reaction force motor 22 detected by a steering-side rotation angle sensor 62. To control the control amounts, the steering control device 50 refers to currents ius, ivs, iws flowing through the reaction force motor 22. The currents ius, ivs, iws may be, for example, currents that are each detected as an amount of voltage drop of a shunt resistor provided in each leg of the reaction force inverter 24. To control the control amounts, the steering control device 50 refers to a rotation angle θb that is an angle of a rotating shaft of the turning motor 42 detected by a turning-side rotation angle sensor 64. To control the control amounts, the steering control device 50 refers to currents iut, ivt, iwt flowing through the turning motor 42. The currents iut, ivt, iwt may be, for example, currents that are each detected as an amount of voltage drop of a shunt resistor provided in each leg of the turning inverter 44.

The steering control device 50 can communicate with a braking ECU 70. The braking ECU 70 controls a braking device of the vehicle as a target. The braking ECU 70 acquires wheel speeds ωw1 to ωw4 that are respective speeds of four wheels detected by a wheel speed sensor 72. When there is no abnormality in the wheel speeds ωw1 to ωw4, the braking ECU 70 transmits it to the steering control device 50. When there is an abnormality in the wheel speeds ωw1 to ωw4, the braking ECU 70 notifies the steering control device 50 to that effect.

The steering control device 50 can communicate with a superordinate ECU 80. The superordinate ECU 80 executes a process of generating a command for intervening in steering of the vehicle, independently of an order for steering by operation of the steering wheel 12. To execute a process of intervening in the steering, the superordinate ECU 80 acquires image data of surroundings of the vehicle captured by a camera 82. The superordinate ECU 80 grasps, for example, indication of an intension as to whether intervention in the steering is possible that is input by the driver through an interface 84.

The steering control device 50 includes a PU 52 and a storage device 54. The PU 52 is a software processing device, such as a CPU, a GPU, or a TPU. The storage device 54 may be a non-volatile memory that can be electrically rewritable. The storage device 54 may be a non-volatile memory that can be electrically rewritable and a storage medium, such as a disc medium.

Overview of Control

Figure 2:
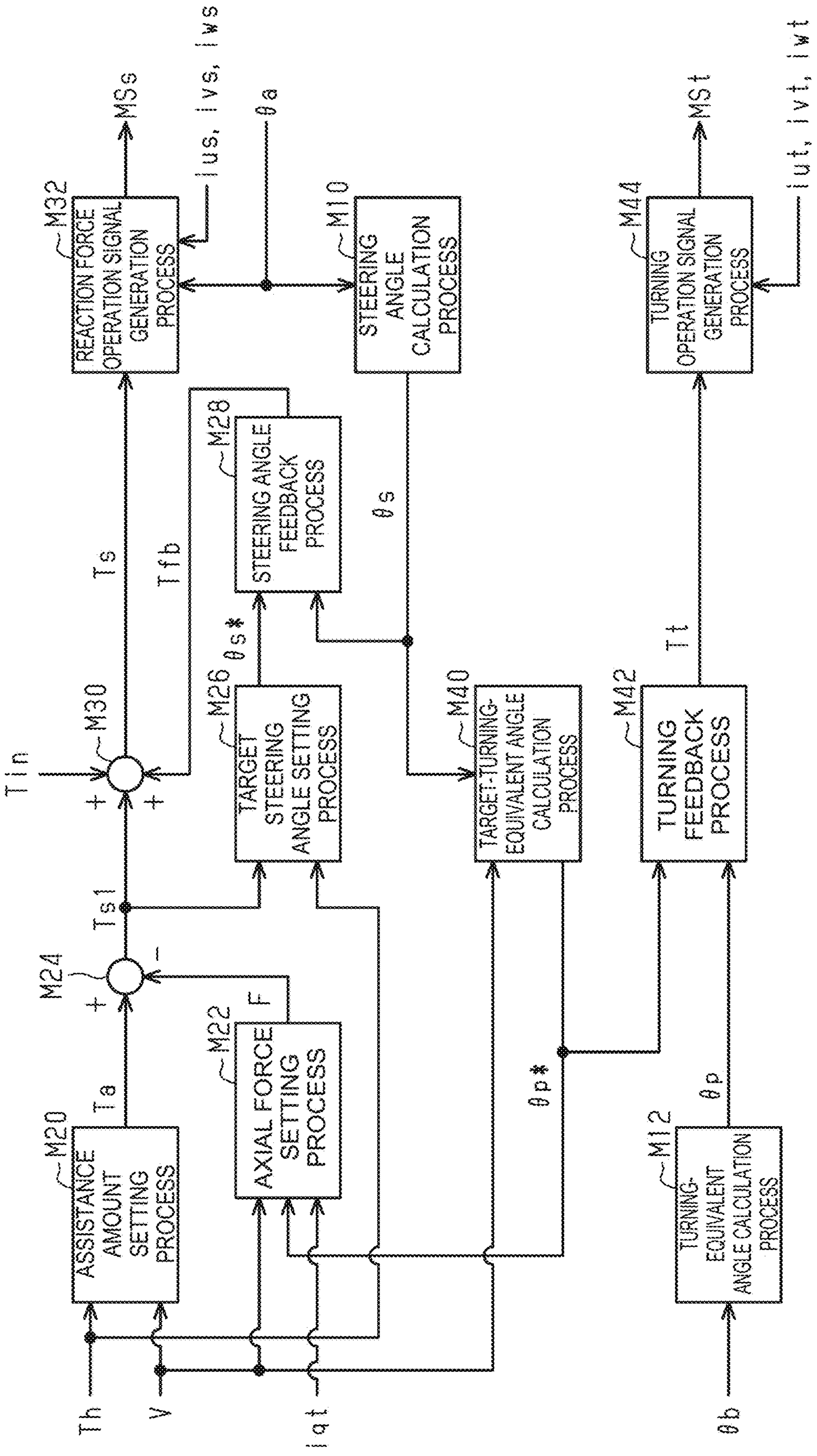
FIG. 2 is a block diagram showing processes that a control device according to the embodiment executes.

FIG. 2 shows processes that the steering control device 50 executes. The processes shown in FIG. 2 are realized as the PU 52 repeatedly executes programs stored in the storage device 54, for example, on a predetermined cycle.

A steering angle calculation process M10 includes a process of converting the rotation angle θa into an integrated angle including a range exceeding 360 degrees by, for example, counting the number of revolutions of the reaction force motor 22 from a steering neutral position that is a position of the steering wheel 12 when the vehicle is moving straight forward. The steering angle calculation process M10 includes a process of calculating a steering angle θs by multiplying the integrated angle obtained by the conversion by a conversion factor based on a rotation speed ratio of the reaction force speed reduction mechanism 26.

A turning-equivalent angle calculation process M12 includes a process of converting the rotation angle θb into an integrated angle including a range exceeding 360 degrees by, for example, counting the number of revolutions of the turning motor 42 from a rack neutral position that is a position of the rack shaft 32 when the vehicle is moving straight forward. The turning-equivalent angle calculation process M12 includes a process of calculating a turning-equivalent angle θp according to the turning angle of the turning wheels 34 by multiplying the integrated angle obtained by the conversion by a conversion factor according to a speed reduction ratio of the turning transmission mechanism 46, a lead of the conversion mechanism 48, etc. The turning-equivalent angle θp is an amount that is in a proportional relationship with the turning angle. As one example, the turning-equivalent angle θp is positive when it is an angle on a right side of the rack neutral position and negative when it is an angle on a left side thereof.

A target-turning-equivalent angle calculation process M40 is a process of calculating a target-turning-equivalent angle θp* according to the steering angle θs and the vehicle speed V. An assistance amount setting process M20 is a process of calculating an assistance amount Ta using the steering torque Th and the vehicle speed V as an input. The assistance amount Ta is an amount in the same direction as the driver's steering direction. The magnitude of the assistance amount Ta is set to a large value when a force for assisting the driver's steering is to be made large.

An axial force setting process M22 is a process of calculating an axial force F that acts on the rack shaft 32 through the turning wheels 34 using the vehicle speed V, a q-axis current iqt of the turning motor 42, and the target-turning-equivalent angle θp* as an input. The axial force F is a value that represents, by control, a force acting on the rack shaft 32 through the turning wheels 34. However, the axial force F need not be intended to estimate the force acting on the rack shaft 32 with high accuracy. The axial force F may be, for example, a force that virtually specifies the force acting on the rack shaft 32. The axial force F is converted into a torque applied to the steering shaft 14. That is, the axial force F is converted into a torque that is applied to the steering shaft 14 when a state is assumed where power transmission between the turning wheels 34 and the steering shaft 14 is possible. The axial force F is an amount that acts in the opposite direction from the driver's steering direction. The axial force setting process M22 may be a process of calculating the axial force F such that the absolute value of the axial force F becomes larger as the absolute value of the target-turning-equivalent angle θp* becomes larger. The axial force setting process M22 may be, for example, a process of calculating the axial force F such that the absolute value of the axial force F becomes larger as the vehicle speed V becomes higher. The axial force setting process M22 may be a process of calculating the axial force F such that the absolute value of the axial force F becomes larger as the absolute value of the q-axis current iqt becomes larger. Here, the q-axis current iqt is calculated by the PU 52 according to the turning-equivalent angle θp and the currents iut, ivt, iwt.

A subtraction process M24 is a process of assigning a value obtained by subtracting the axial force F from the assistance amount Ta to a target reaction force torque Ts1. The target reaction force torque Ts1 is a target value of the torque that the reaction force motor 22 applies to the steering shaft 14.

A target steering angle setting process M26 is a process of setting a target steering angle θs* using the target reaction force torque Ts1 and the steering torque Th as an input. The target steering angle setting process M26 is a process of setting the target steering angle θs* using a model. The model specifies the target steering angle θs* using the sum of the target reaction force torque Ts1 and the steering torque Th as an input. The model may be one obtained by modeling a steering angle corresponding to an ideal turning angle according to an input torque by experiments etc. beforehand based on the assumption of a steering device in which the steering wheel 12 and the turning wheels 34 are mechanically coupled together. The target steering angle setting process M26 is a process of obtaining an input torque by adding up the target reaction force torque Ts1 and the steering torque Th, and then calculating the target steering angle θs* based on the model from this input torque.

A steering angle feedback process M28 is a process of calculating a feedback correction amount Tfb by inputting the steering angle θs and the target steering angle θs*. The feedback correction amount Tfb is an operation amount of feedback control in which the steering angle θs is a control amount and the target steering angle θs* is a target value of the control amount.

A superimposing process M30 is a process of assigning, to the target reaction force torque Ts, a value obtained by adding the feedback correction amount Tfb to the target reaction force torque Ts1. However, in the case where an intervention torque Tin has been input from the superordinate ECU 80, the superimposing process M30 is a process of assigning, to the target reaction force torque Ts, a value obtained by adding the feedback correction amount Tfb and the intervention torque Tin to the target reaction force torque Ts1. The intervention torque Tin is a correction amount for the target reaction force torque Ts1 that the superordinate ECU 80 uses to intervene in the steering.

A reaction force operation signal generation process M32 is a process of generating an operation signal MSs for the reaction force inverter 24 so as to control the torque of the reaction force motor 22 such that the torque applied to the steering shaft 14 meets the target reaction force torque Ts. Specifically, the reaction force operation signal generation process M32 includes a process of converting the target reaction force torque Ts into a target torque of the reaction force motor 22. Further, the reaction force operation signal generation process M32 includes a process of calculating the operation signal MSs for the reaction force inverter 24 so as to bring the current flowing through the reaction force motor 22 close to a current that is determined from the target reaction force torque Ts by current feedback control. The operation signal MSs is, in reality, an operation signal for each of six switching elements of the reaction force inverter 24. As the torque of the reaction force motor 22 is set to the target reaction force torque Ts, the steering reaction force acting against the force that tries to rotate the steering wheel 12 becomes "(−1)·Ts."

A target-turning-equivalent angle calculation process M40 is a process of calculating a target-turning-equivalent angle θp* according to the steering angle θs and the vehicle speed V. A turning feedback process M42 is a process of assigning, to a target turning torque Tt, an operation amount of feedback control in which the turning-equivalent angle θp is a control amount and the target-turning-equivalent angle θp* is a target value of the control amount. The target turning torque Tt has a constant ratio to the torque of the turning motor 42.

A turning operation signal generation process M44 is a process of generating an operation signal MSt for the turning inverter 44 so as to control the torque of the turning motor 42 such that the torque of the turning motor 42 becomes a value having a constant ratio to the target turning torque Tt. Specifically, the turning operation signal generation process M44 includes a process of converting the target turning torque Tt into the target torque of the turning motor 42. Further, the turning operation signal generation process M44 includes a process of calculating the operation signal MSt for the turning inverter 44 so as to bring the current flowing through the turning motor 42 close to a current that is determined from the target torque by current feedback control. The operation signal MSt is, in reality, an operation signal for each of six switching elements of the turning inverter 44.

Assistance Amount Setting Process

Figure 3:
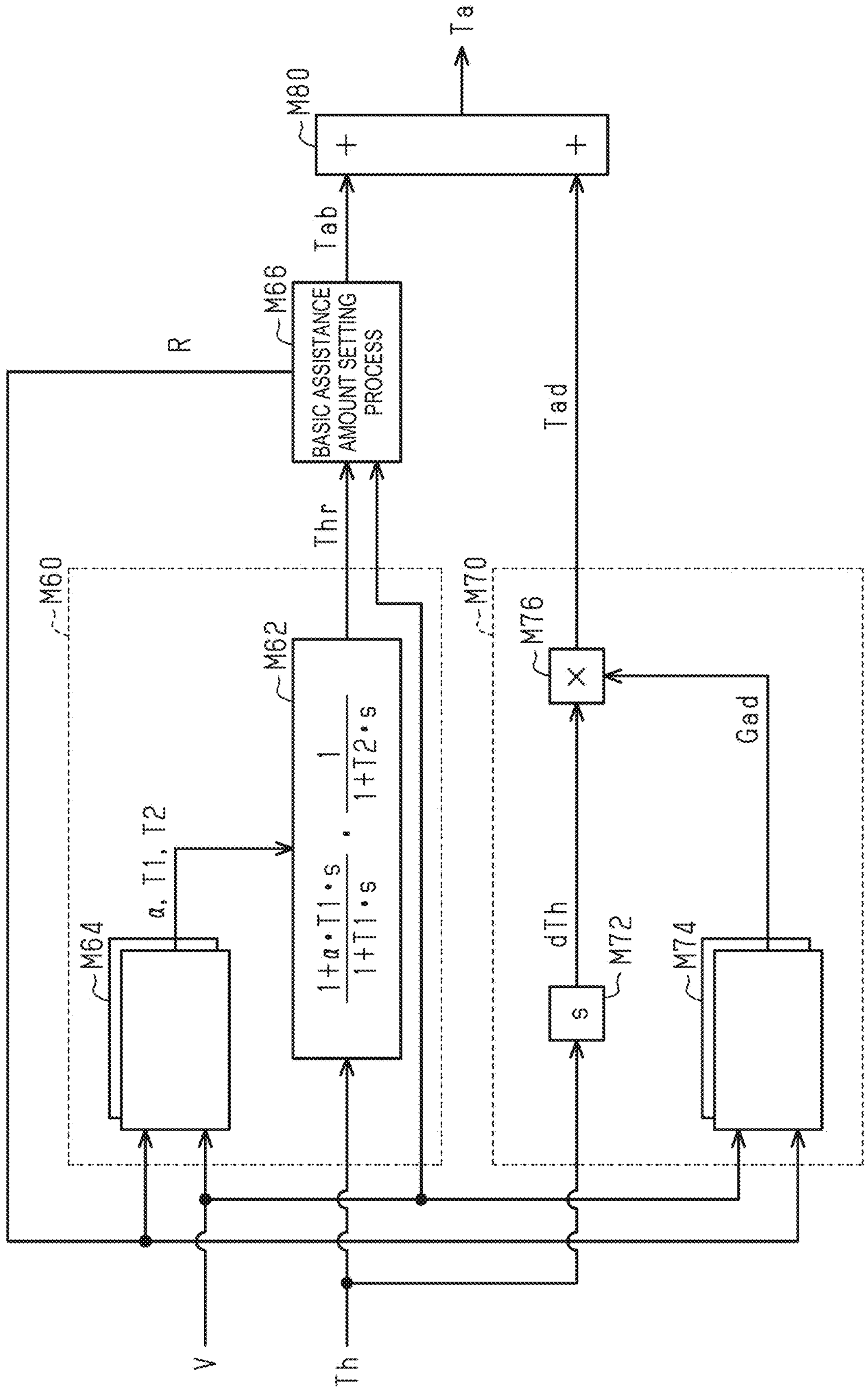
FIG. 3 is a block diagram showing processes that the control device according to the embodiment executes.

FIG. 3 shows details of the assistance amount setting process M20. A phase delay compensation process M60 is a process of delaying a phase of the steering torque Th. For example, this may be a process that aims at performing phase compensation on the steering torque Th so as to adjust a frequency characteristic of a phase difference between both sides of a torsion bar included in the torque sensor 60. The steering torque Th after the phase compensation that is an output value of the phase delay compensation process M60 is a steering torque Thr. The phase delay compensation process M60 includes a filter process M62 and a filter coefficient setting process M64.

The filter process M62 includes a phase delay filter and a low-pass filter. A transfer function of the phase delay filter is "(1+α·T1·s)/(1+T1·s)." A transfer function of the low-pass filter is "1/(1+T2·s)." A value obtained by processing the steering torque Th by the phase delay filter and the low-pass filter is the steering torque Thr.

The filter coefficient setting process M64 sets filter coefficients α, T1 of the phase delay filter and a filter coefficient T2 of the low-pass filter. The filter coefficient setting process M64 sets the filter coefficients α, T1, T2 according to an assistance gradient R and the vehicle speed V. Specifically, as one example, the filter coefficient setting process M64 is a process of performing a map-based calculation of the filter coefficients α, T1, T2 by the PU 52 in a state where map data is stored in the storage device 54. The map data is the following three types of data: One is data in which the assistance gradient R and the vehicle speed V are input variables and the filter coefficient α is an output variable. Another is data in which the assistance gradient R and the vehicle speed V are input variables and the filter coefficient T1 is an output variable. The other one is data in which the assistance gradient R and the vehicle speed V are input variables and the filter coefficient T2 is an output variable.

The map data refers to combinational data on discrete values of the input variable and values of the output variable corresponding to the respective values of the input variable. The map-based calculation may be a process in which, when the value of the input variable matches one of the values of the input variable in the map data, the corresponding value of the output variable in the map data is used as a calculation result. Or the map-based calculation may be a process in which, when the value of the input variable matches none of the values of the input variable in the map data, a value obtained by interpolation of the plurality of values of the output variable included in the map data is used as a calculation result. Or, instead of this, the map-based calculation may be a process in which, when the value of the input variable matches none of the values of the input variable in the map data, the value of the output variable in the map data that corresponds to the closest value among the plurality of values of the input variable included in the map data is used as a calculation result.

A basic assistance amount setting process M66 is a process of setting a basic assistance amount Tab using the steering torque Thr and the vehicle speed V as an input. The basic assistance amount setting process M66 sets the basic assistance amount Tab to a value having a positive correlation with the steering torque Thr. This process may be, for example, a process of performing a map-based calculation of the basic assistance amount Tab by the PU 52 in a state where map data is stored in the storage device 54 beforehand. The map data is data in which the steering torque Thr and the vehicle speed V are input variables and the basic assistance amount Tab is an output variable.

The basic assistance amount setting process M66 includes a process of calculating and outputting the assistance gradient R. The assistance gradient R indicates a ratio of a change in the basic assistance amount Tab to a change in the steering torque Thr.

A phase advance compensation process M70 is a process of advancing a phase of the assistance amount Ta. For example, this may aim at performing phase compensation on the assistance amount Ta so as to adjust a response delay in a change of the steering wheel 12 relative to a change in the steering torque Th. The phase advance compensation process M70 includes a differential calculation M72, a gain setting process M74, and a multiplication process M76.

The differential calculation M72 is a process of calculating a first-order time differential value dTh of the steering torque Th. The gain setting process M74 is a process of setting a gain Gad using the assistance gradient R and the vehicle speed V as an input. As one example, the gain setting process M74 is a process of performing a map-based calculation of the gain Gad in a state where map data is stored in the storage device 54 beforehand. This map data is data in which the assistance gradient R and the vehicle speed V are input variables and the gain Gad is an output variable.

The multiplication process M76 is a process of multiplying the time differential value dTh by the gain Gad. The product of the time differential value dTh and the gain Gad is an advance compensation amount Tad as an output of the phase advance compensation process M70.

A synthesis process M80 is a process of adding the advance compensation amount Tad to the basic assistance amount Tab. A value thus calculated is the assistance amount Ta.

Mode-by-Mode Phase Compensation Process

Figure 4:
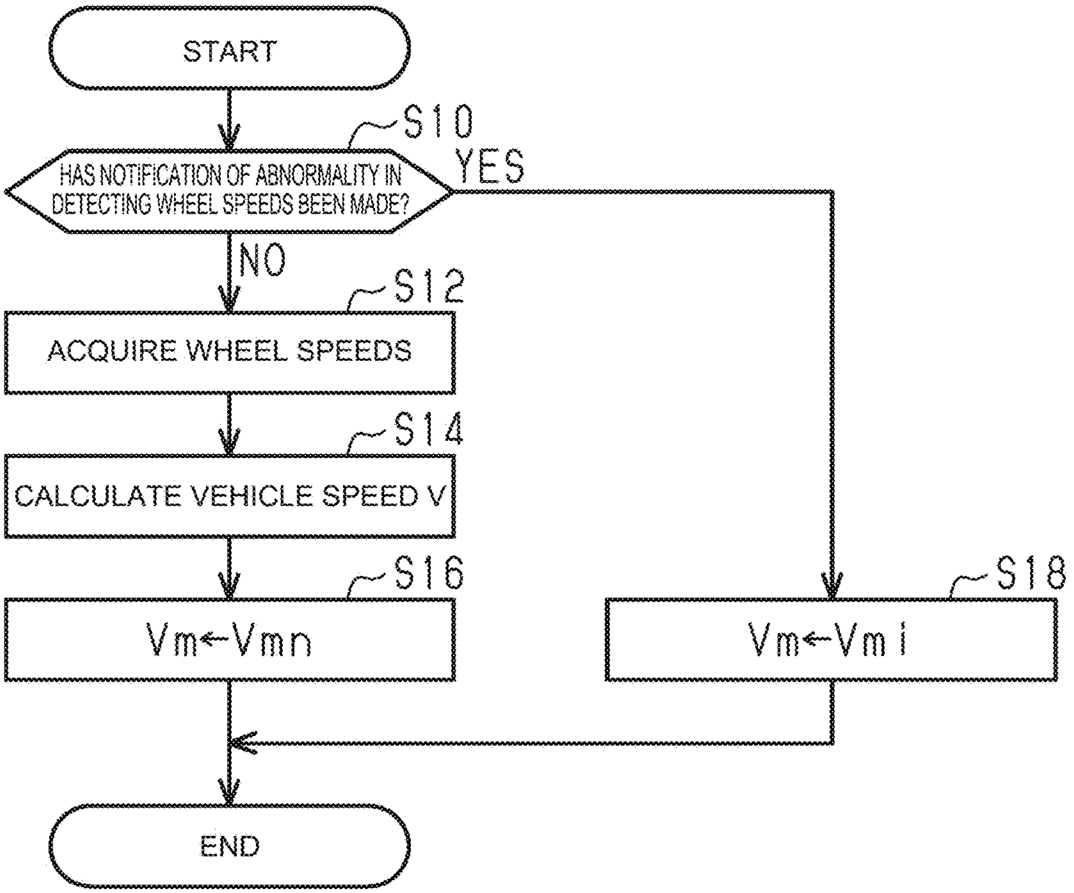
FIG. 4 is a flowchart showing a procedure of a process that the control device according to the embodiment executes.

FIG. 4 shows a procedure of a process of switching the phase compensation by the phase delay compensation process M60 and the phase advance compensation process M70 according to the mode. The process shown in FIG. 4 is realized as the PU 52 repeatedly executes a program stored in the storage device 54, for example, on a predetermined cycle. Hereinafter, numbers with "S" added at the beginning represent step numbers of the respective processes.

In the series of processes shown in FIG. 4, the PU 52 determines whether a notification that an abnormality has occurred in detecting the wheel speeds ωw1 to ωw4 has been made from the braking ECU 70 (S10). This process is a process of determining whether the mode is a mode in which there is an abnormality in a detected value of the vehicle speed.

When the PU 52 determines that no notification has been made (S10: NO), since the mode is a normal mode, the PU 52 acquires the wheel speeds ωw1 to ωw4 through the braking ECU 70 (S12). Then, the PU 52 calculates the vehicle speed V from the wheel speeds ωw1 to ωw4 (S14). The vehicle speed V may be, for example, a predetermined number-th largest value of the wheel speeds ωw1 to ωw4. Or the vehicle speed V may be, for example, an average value of the wheel speeds ωw1 to ωw4.

Then, the PU 52 assigns a normal-mode variable value Vmn to a map identifying variable Vm that identifies a map for performing a map-based calculation of each of the filter coefficients α, T1, T2 and the gain Gad (S16). Thus, the filter coefficient setting process M64 becomes a process of performing a map-based calculation using, of map data for the normal mode and map data for an abnormal mode that are stored in the storage device 54, the map data for the normal mode. The gain setting process M74 becomes a process of performing a map-based calculation using, of map data for the normal mode and map data for the abnormal mode that are stored in the storage device 54, the map data for the normal mode.

On the other hand, when the PU 52 determines that the notification has been made (S10: YES), the PU 52 assigns an abnormal-mode variable value Vmi to the map identifying variable Vm (S18). Thus, the filter coefficient setting process M64 becomes a process of performing a map-based calculation using, of the map data for the normal mode and the map data for the abnormal mode that are stored in the storage device 54, the map data for the abnormal mode. Here, the vehicle speed V need not be the input variable in the map data. The gain setting process M74 becomes a process of performing a map-based calculation using, of the map data for the normal mode and the map data for the abnormal mode that are stored in the storage device 54, the map data for the abnormal mode. Here, the vehicle speed V need not be the input variable in the map data.

When the processes of S16 and S18 are completed, the PU 52 temporarily ends the series of processes shown in FIG. 4.

Workings and Advantages of Embodiment

The PU 52 sets the target reaction force torque Ts by subtracting the axial force F from the assistance amount Ta. Then, the torque of the reaction force motor 22 is controlled according to the target reaction force torque Ts. The PU 52 sets the assistance amount Ta using the phase delay compensation process M60 and the phase advance compensation process M70. The filter coefficients α, T1, T2 in the phase delay compensation process M60 and the gain Gad in the phase advance compensation process M70 are set according to the vehicle speed V. Thus, appropriate phase compensation that can keep the steering system stable can be performed according to the vehicle speed V.

However, when an abnormality occurs in detecting the wheel speeds ωw1 to ωw4, a highly reliable vehicle speed V cannot be used in setting the filter coefficients α, T1, T2 and the gain Gad to appropriate values. In the event of the abnormality, therefore, the PU 52 sets the filter coefficients α, T1, T2 and the gain Gad to values for abnormal events. Thus, even when the PU 52 cannot grasp the accurate vehicle speed, appropriate filter coefficients α, T1, T2 and gain Gad for stabilizing the steering system can be set. In other words, regardless of the magnitude of the actual vehicle speed, appropriate filter coefficients α, T1, T2 and gain Gad for stabilizing the steering system can be set. Here, the filter coefficients α, T1, T2 and the gain Gad can be set, for example, to such values that the steering system can be stabilized within a range of values that the actual vehicle speed can assume.

At normal times, the filter coefficients α, T1, T2 and the gain Gad are changed according to the vehicle speed V, so that optimal phase compensation can be realized within such a range that the steering system can be stabilized.

Second Embodiment

In the following, a second embodiment will be described with reference to a drawing, mainly in terms of differences from the first embodiment.

Figure 5:
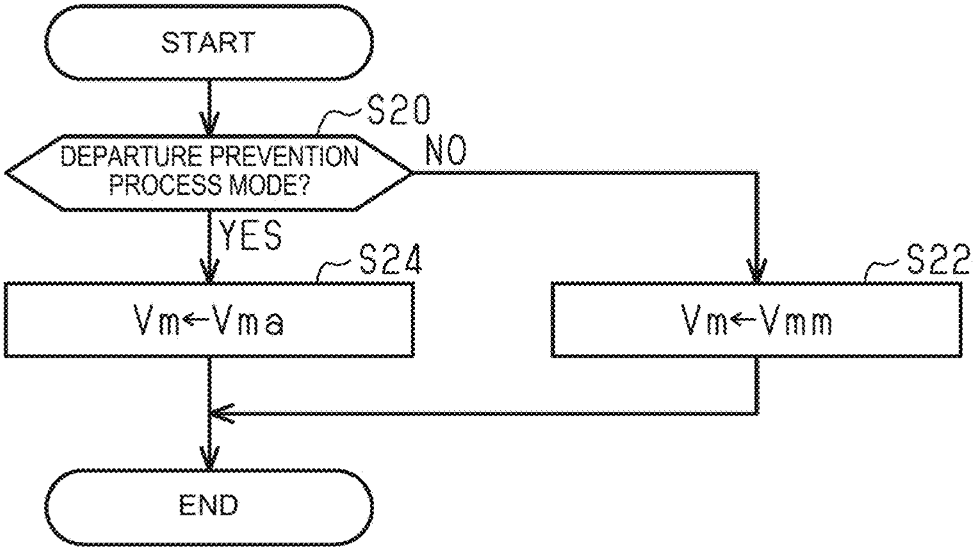
FIG. 5 is a flowchart showing a procedure of a process that a control device according to a second embodiment executes.

In this embodiment, the manner of the phase compensation is changed according to a mode in which the superordinate ECU 80 intervenes in steering to prevent departure from a lane and a mode in which the superordinate ECU 80 does not intervene. FIG. 5 shows a procedure of a process of switching the phase compensation by the phase delay compensation process M60 and the phase advance compensation process M70 according to the mode. The process shown in FIG. 5 is realized as the PU 52 repeatedly executes a program stored in the storage device 54, for example, on a predetermined cycle.

In the series of processes shown in FIG. 5, the PU 52 first determines whether the mode is a departure prevention process mode (S20). The departure prevention process mode is a mode in which the superordinate ECU 80 executes control that helps prevent departure from the lane based on the aforementioned image data. When the PU 52 determines that the mode is not the departure prevention process mode (S20: NO), the PU 52 assigns a manual-driving-mode variable value Vmm to the map identifying variable Vm (S22). Thus, the filter coefficient setting process M64 becomes a process of performing a map-based calculation using, of map data for a manual driving mode and map data for a departure prevention mode that are stored in the storage device 54, the map data for the manual driving mode. The gain setting process M74 becomes a process of performing a map-based calculation using, of map data for the manual driving mode and map data for the departure prevention mode that are stored in the storage device 54, the map data for the manual driving mode.

On the other hand, when the PU 52 determines that the mode is the departure prevention process mode (S20: YES), the PU 52 assigns a departure-prevention-mode variable value Vma to the map identifying variable Vm (S24). Thus, the filter coefficient setting process M64 becomes a process of performing a map-based calculation using, of the map data for the manual driving mode and the map data for the departure prevention mode that are stored in the storage device 54, the map data for the departure prevention mode. The gain setting process M74 becomes a process of performing a map-based calculation using, of the map data for the manual driving mode and the map data for the departure prevention mode that are stored in the storage device 54, the map data for the departure prevention mode.

When the processes of S22 and S24 are completed, the PU 52 temporarily ends the series of processes shown in FIG. 5.

The reaction force setting process corresponds to the assistance amount setting process M20, the axial force setting process M22, the subtraction process M24, the target steering angle setting process M26, the steering angle feedback process M28, and the superimposing process M30. The reaction force application process corresponds to the reaction force operation signal generation process M32. The phase compensation process corresponds to the phase delay compensation process M60 and the phase advance compensation process M70. The travel modes correspond to the mode in which it has not been determined that there is an abnormality in the vehicle speed and the mode in which it has been determined to that effect. Further, the travel modes correspond to the departure prevention process mode and the manual driving mode. The phase compensation specifying variable corresponds to the filter coefficients α, T1, T2 and the gain Gad. The variable changing process corresponds to the filter coefficient setting process M64 and the gain setting process M74. The value for abnormalities corresponds to the filter coefficients α, T1, T2 and the gain Gad that are set using the maps corresponding to the abnormal-mode variable value Vmi. The intervention mode corresponds to the departure prevention process mode. The non-intervention mode corresponds to the manual driving mode. The value of the phase compensation variable in the intervention mode corresponds to the filter coefficients α, T1, T2 and the gain Gad that are set using the maps corresponding to the departure-prevention-mode variable value Vma. The value of the phase compensation variable in the non-intervention mode corresponds to the filter coefficients α, T1, T2 and the gain Gad that are set using the maps corresponding to the manual-driving-mode variable value Vmm.

Other Embodiments

The embodiments can be implemented with the following changes made thereto. The embodiments and the following modified examples can be implemented in combinations within such a range that no technical inconsistency arises.

About Phase Delay Compensation Process

The filter coefficient setting process M64 is not limited to the process that uses the vehicle speed V, the assistance gradient R, and the map identifying variable Vm as the input. For example, the input for the filter coefficient setting process M64 may be the assistance gradient R and the map identifying variable Vm. Or, for example, the input for the filter coefficient setting process M64 may be the vehicle speed V and the map identifying variable Vm.

The phase delay filter included in the filter process M62 is not limited to the above-described filter in which the orders of the Laplace operators of the denominator and the numerator are both 1. It is not essential that the filter process M62 includes the phase delay filter and the low-pass filter. For example, the filter process M62 may include only the phase delay filter.

In the above-described embodiment, the filter coefficients α, T1, T2 are targets to be changed by the filter coefficient setting process M64, but the targets to be changed are not limited thereto. For example, only two of the three filter coefficients α, T1, T2 may be the targets to be changed. Or, for example, only one of the three filter coefficients α, T1, T2 may be the target to be changed.

About Phase Advance Compensation Process

The gain setting process M74 is not limited to the process that uses the vehicle speed V, the assistance gradient R, and the map identifying variable Vm as the input. For example, the input for the gain setting process M74 may be the assistance gradient R and the map identifying variable Vm. Or, for example, the input for the gain setting process M74 may be the vehicle speed V and the map identifying variable Vm.

A low-pass filter may be provided between the differential calculation M72 and the multiplication process M76. In this case, a filter coefficient of the low-pass filter may be changed according to the travel mode. Instead of multiplying the time differential value dTh by the gain Gad in the multiplication process M76, map data in which the time differential value dTh is an input and the advance compensation amount Tad is an output may be included. In addition to the time differential value dTh, a variable indicating the travel mode may be included as the input variable in this map data. Further, in addition to the time differential value dTh, a variable indicating the vehicle speed V may be included as the input variable in this map data.

It is not essential that the phase advance compensation process includes the process of calculating the time differential value dTh. For example, instead of calculating the time differential value dTh, a process of using the steering torque Th as an input for a phase advance compensation filter may be included.

About Phase Compensation Process

It is not essential that the phase compensation process is composed of the phase delay compensation process M60 and the phase advance compensation process M70. For example, only either of the phase delay compensation process M60 and the phase advance compensation process M70 may be included. Or, for example, a process other than the two processes of the phase delay compensation process M60 and the phase advance compensation process M70 may be further included.

About Axial Force Setting Process

It is not essential that the input for the axial force setting process is the q-axis current iqt, the vehicle speed V, and the target-turning-equivalent angle θp*. For example, the angular variable of the steering system is not limited to the target-turning-equivalent angle θp* and may instead be the turning-equivalent angle θp. Or the angular variable of the steering system may be the steering angle θs. As far as the three of the q-axis current iqt, the vehicle speed V, and the angular variable of the steering system are concerned, the input for the axial force setting process may be only two of them. Or as far as these three are concerned, the input for the axial force setting process may be only one of them.

About Phase Compensation Specifying Variables of Different Values in Different Modes In the above-described embodiments, all of the filter coefficients α, T1, T2 of the phase delay compensation process M60 are changed using the map identifying variable Vm as the input, but the embodiments are not limited thereto. For example, only two of the three filter coefficients α, T1, T2 may be changed using the map identifying variable Vm as the input. Or, for example, only one of the three filter coefficients α, T1, T2 may be changed using the map identifying variable Vm as the input.

In the case where both of the phase delay compensation process M60 and the phase advance compensation process M70 are executed, it is not essential that the manner of the phase compensation is changed according to the mode for both of these processes. For example, the manner of only one of these two processes may be changed.

About Modes with Different Manners of Phase Compensation

The mode in which a diagnosis that there is an abnormality has been made and the mode at normal times are not limited to the modes according to whether there is an abnormality relating to the detected value of the vehicle speed V. For example, these modes may be modes according to whether there is an abnormality in the torque sensor 60. Or, for example, these modes may be modes according to whether there is an abnormality in one of a plurality of PUs 52 in a redundant system in which the steering control device 50 has the plurality of PUs 52. Or, for example, these modes may be modes according to whether there is an abnormality in communication among a plurality of PUs 52 in a redundant system in which the steering control device 50 has the plurality of PUs 52.

The intervention mode and the non-intervention mode are not limited to the departure prevention process mode and the manual driving mode. For example, the intervention mode may be a mode in which the superordinate ECU 80 executes a process of turning the turning wheels 34 in a state where the driver does not touch the steering wheel 12. Also in this case, changing the filter coefficients α, T1, T2 and the gain Gad according to the mode is effective, for example, when inputting the intervention torque Tin to where the steering torque Th is input, instead of inputting the intervention torque Tin into the superimposing process M30.

In the process of S20, whether the mode is the departure prevention process mode is determined. Instead of this, for example, whether the intervention torque Tin has been input from the superordinate ECU 80 may be determined.

About Steering Control Device

The steering control device is not limited to one that executes software processing. For example, the steering control device may include a dedicated hardware circuit, such as an ASIC, that executes at least some of the processes executed in the above-described embodiments. Thus, the steering control device should at least include a processing circuit that includes one of the following configurations (a) to (c): (a) a processing circuit including a processing device that executes all of the above-described processes in accordance with programs, and a program storage device that stores the programs, such as a storage device; (b) a processing circuit including a processing device that executes some of the above-described processes in accordance with programs, a program storage device, and a dedicated hardware circuit that executes the rest of the processes; and (c) a processing circuit including a dedicated hardware circuit that executes all of the above-described processes. Here, there may be a plurality of software execution devices including a processing device and a program storage device. Further, there may be a plurality of dedicated hardware circuits.

OTHERS

It is not essential that the turning motor 42 is a synchronous motor. For example, the turning motor 42 may be an induction motor.

In each of the above-described embodiments, the steering device 10 has a link-less structure in which the steering wheel 12 and the turning wheels 34 are mechanically always cut off from each other. However, the steering device 10 is not limited thereto and may have a structure in which the steering wheel 12 and the turning wheels 34 can be mechanically cut off from each other by a clutch.

What is claimed is:

1. A steering control device comprising a processor that is configured to control, as a target, a steering system including a reaction force motor that applies a steering reaction force to a steering shaft of a vehicle and a turning motor that turns a turning wheel of the vehicle, and to execute a reaction force setting process, a phase compensation process, and a reaction force application process, wherein:

- the reaction force setting process is a process of setting the steering reaction force using the phase compensation process;
- the reaction force application process is a process of operating the reaction force motor so as to apply, to the steering shaft, the steering reaction force that has been set by the reaction force setting process; and
- the phase compensation process is a process of performing phase compensation of the steering reaction force that is to be applied to the steering shaft by the reaction force motor in a manner that differs for different travel modes of the vehicle.

2. The steering control device according to claim 1, wherein the different travel modes among which the manner of the phase compensation differs include a mode in which a diagnosis that there is an abnormality has been made and a mode for normal times.

3. The steering control device according to claim 2, wherein:

the phase compensation process is a process of performing phase compensation of the steering reaction force according to a value of a phase compensation specifying variable, and includes a variable changing process;
the phase compensation specifying variable is a variable that specifies the manner of the phase compensation;
the variable changing process includes a process of changing the value of the phase compensation specifying variable according to a vehicle speed;
the mode in which the diagnosis that there is the abnormality has been made includes a mode in which a diagnosis that there is the abnormality in a detected value of the vehicle speed has been made; and
the phase compensation process includes a process of executing the phase compensation with the value of the phase compensation specifying variable set to a value for the abnormality in the mode in which the diagnosis that there is the abnormality in the detected value of the vehicle speed has been made.

4. The steering control device according to claim 1, wherein:
the different travel modes among which the manner of the phase compensation differs include an intervention mode and a non-intervention mode;
the intervention mode is a mode in which control intervenes in the turning of the turning wheel according to information on a relationship between the vehicle and an outside of the vehicle;
the non-intervention mode is a mode in which the intervention is not performed;
the phase compensation process is a process of performing phase compensation of the steering reaction force according to a value of a phase compensation specifying variable;
the phase compensation specifying variable is a variable that specifies the manner of the phase compensation; and
the phase compensation process includes a process of executing the phase compensation according to the value of the phase compensation specifying variable that differs between the intervention mode and the non-intervention mode.

5. The steering control device according to claim 1, wherein:
the reaction force setting process includes an assistance amount setting process and an axial force setting process;
the axial force setting process is a process of setting an axial force that is a force acting against a driver's operation of rotating the steering shaft;
the assistance amount setting process is a process of setting an assistance amount according to a detected value of a steering torque;
the assistance amount is an amount of assisting the driver in rotating the steering shaft;
the steering reaction force is an amount that is determined according to a value obtained by subtracting the assistance amount from the axial force;
the phase compensation process includes a phase delay compensation process;
the phase delay compensation process is a process of delaying a phase of the detected value used for setting the assistance amount according to a delay specifying variable; and
the delay specifying variable is a variable that specifies the phase delay compensation process and assumes a different value for the different travel modes.

6. The steering control device according to claim 1, wherein:
the reaction force setting process includes an assistance amount setting process and an axial force setting process;
the axial force setting process is a process of setting an axial force that is a force acting against a driver's operation of rotating the steering shaft;
the assistance amount setting process is a process of setting an assistance amount and includes the phase compensation process and a basic assistance amount setting process;
the assistance amount is an amount of assisting the driver in rotating the steering shaft;
the basic assistance amount setting process is a process of setting a basic assistance amount according to a detected value of a steering torque input into the steering shaft;
the phase compensation process includes a phase advance compensation process;
the phase advance compensation process is a process of calculating, according to an advance specifying variable, an advance correction amount for the basic assistance amount in order for the assistance amount setting process to set the assistance amount from the basic assistance amount using the detected value as an input;
the steering reaction force is an amount that is determined according to a value obtained by subtracting the assistance amount from the axial force; and
the advance specifying variable is a variable that specifies the phase advance compensation process and assumes a different value for the different travel modes.

7. A steering control device comprising a processor that is configured to control, as a target, a steering system including a reaction force motor that applies a steering reaction force to a steering shaft of a vehicle and a turning motor that turns a turning wheel of the vehicle, and to execute a reaction force setting process, a phase compensation process, and a reaction force application process, wherein:
the reaction force setting process is a process of setting the steering reaction force using the phase compensation process;
the reaction force application process is a process of operating the reaction force motor so as to apply, to the steering shaft, the steering reaction force that has been set by the reaction force setting process;
the phase compensation process is a process of performing phase compensation of the steering reaction force that is to be applied to the steering shaft by the reaction force motor in a manner that differs for different travel modes of the vehicle; and
the different travel modes among which the manner of the phase compensation differs include a first mode in which the phase compensation is performed when a diagnosis that there is an abnormality has been made and a second mode in which the phase compensation is performed in a manner different from in the first mode when the diagnosis that there is the abnormality has not been made.

8. A steering control device comprising a processor that is configured to control, as a target, a steering system including a reaction force motor that applies a steering reaction force to a steering shaft of a vehicle and a turning motor that turns a turning wheel of the vehicle, and to execute a reaction force setting process, a phase compensation process, and a reaction force application process, wherein:

the reaction force setting process is a process of setting the steering reaction force using the phase compensation process;

the reaction force application process is a process of operating the reaction force motor so as to apply, to the steering shaft, the steering reaction force that has been set by the reaction force setting process;

the phase compensation process is a process of performing phase compensation of the steering reaction force that is to be applied to the steering shaft by the reaction force motor in a manner that differs for different travel modes of the vehicle;

the reaction force setting process includes an assistance amount setting process and an axial force setting process;

the axial force setting process is a process of setting an axial force that is a force acting against a driver's operation of rotating the steering shaft;

the assistance amount is an amount of assisting the driver in rotating the steering shaft;

the steering reaction force is an amount that is determined according to a value obtained by subtracting the assistance amount from the axial force;

the phase compensation process is a process of performing phase compensation of the steering reaction force according to a value of a phase compensation specifying variable;

the phase compensation specifying variable is a variable that specifies the manner of the phase compensation; and the phase compensation process includes a process of executing the phase compensation according to the value of the phase compensation specifying variable that differs between the different travel modes of the vehicle.

* * * * *